United States Patent
Cooper

(10) Patent No.: US 7,100,037 B2
(45) Date of Patent: Aug. 29, 2006

(54) METHOD FOR REDUCING BIOS RESUME TIME FROM A SLEEPING STATE

(75) Inventor: Barnes Cooper, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 540 days.

(21) Appl. No.: 10/305,916

(22) Filed: Nov. 27, 2002

(65) Prior Publication Data

US 2004/0103331 A1   May 27, 2004

(51) Int. Cl.
   G06F 9/445   (2006.01)
   G06F 15/177   (2006.01)

(52) U.S. Cl. .................. 713/2; 713/1; 713/2; 713/100

(58) Field of Classification Search ............... 713/1, 713/2, 100
   See application file for complete search history.

(56) References Cited

U.S. PATENT DOCUMENTS

| | | | | |
|---|---|---|---|---|
| 5,758,174 A * | 5/1998 | Crump et al. | | 713/323 |
| 6,098,158 A * | 8/2000 | Lay et al. | | 711/162 |
| 6,393,560 B1 * | 5/2002 | Merrill et al. | | 713/2 |
| 6,434,696 B1 * | 8/2002 | Kang | | 713/2 |
| 6,636,963 B1 * | 10/2003 | Stein et al. | | 713/1 |
| 6,691,234 B1 * | 2/2004 | Huff | | 713/300 |
| 6,807,630 B1 * | 10/2004 | Lay et al. | | 713/2 |
| 6,832,311 B1 * | 12/2004 | Morisawa | | 713/1 |

* cited by examiner

*Primary Examiner*—A. Elamin
*Assistant Examiner*—Nitin C. Patel
(74) *Attorney, Agent, or Firm*—Blakely, Sokoloff, Taylor & Zafman LLP

(57) ABSTRACT

A method for reducing BIOS resume time from a computer system sleeping state, and corresponding components and system for implementing the method. The method first identifies an operating system (OS) type running on a computer system. Based on the operating system type that is identified, a set of BIOS resume tasks specific to that operating system type are dispatched for execution in response to a sleep mode wake event. Generally, the OS-type specific BIOS resume tasks may be stored on various storage means, such as BIOS devices, operating system files, or as a carrier wave. In one embodiment, various generic BIOS resume tasks and corresponding dispatch flag data are stored in one or more tables. In another embodiment, various sets of BIOS resume tasks are stored in separate tables or lists, wherein the sets of BIOS resume tasks may be operating system type and/or computer platform type specific.

29 Claims, 4 Drawing Sheets

METHOD FOR REDUCING BIOS RESUME TIME FROM A SLEEPING STATE

FIELD OF THE INVENTION

The field of invention relates generally to computer systems and, more specifically but not exclusively relates to a method for reducing BIOS resume time from a computer system sleeping state.

BACKGROUND INFORMATION

Today's mobile and desktop systems implement sleeping states as defined by ACPI (Advanced Configuration and Power Interface), whereby the platform and operating system are placed in a sleeping state when there is currently no work to be done. Entry into these low power states is determined through operating system (OS) specific actions and may include (but not be limited to) end user interaction (e.g., lid closure, power button press, etc.) or system inactivity for some period of time. The original concept of Intel's Instantly Available PC or Microsoft's OnNow initiative is that the PC would rapidly wake from the sleeping state and be useable in very short timeframe, much like what occurs with appliances such as VCRs and microwave ovens. In practice however, this has not been the case with PCs, which have historically taken 6–10 seconds to resume normal operation from a sleeping state.

Most PCs implement one or more sleeping states, known as Sx states. S1 places the system in a low power state, but does not typically power off any devices. Namely, the processor is still powered, as are most devices. Historically, this type of sleeping state is less desirable from a power point of view, but has been able to achieve faster wake times. States lower in power than S1, namely S2 and S3, power off a large portion of the system, including the processor. For these states, it is necessary for the system BIOS to initialize the processor and memory as well as some number of system level devices, prior to handing control back to the operating system. This BIOS initialization time after an S2 or S3, is known as the BIOS resume time, and it is a critical component in achieving shorter resume times for the PC.

There are two parts of the problem for achieving faster wake times. The system BIOS wake time occurs first, after the end user has requested that the machine wake from the sleeping state until the time at which the BIOS passes control back to the operating system. The second part of the problem is the OS resume time. This is defined as the time it takes for the OS to reinitialize device drivers and bring the machine back to a useable state, where the end user can begin interacting with the machine. Originally, the OS wake time was very long for initial ACPI implementations, on the order of 4–6 seconds. This has been dramatically reduced on current operating systems, and some systems have achieved <1 s OS wake time. As a result, the BIOS resume time comprises the bulk of the time lapse between activation of a wakening event and the PC becoming available for use.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION OF PREFERRED EMBODIMENTS

Figure 1:
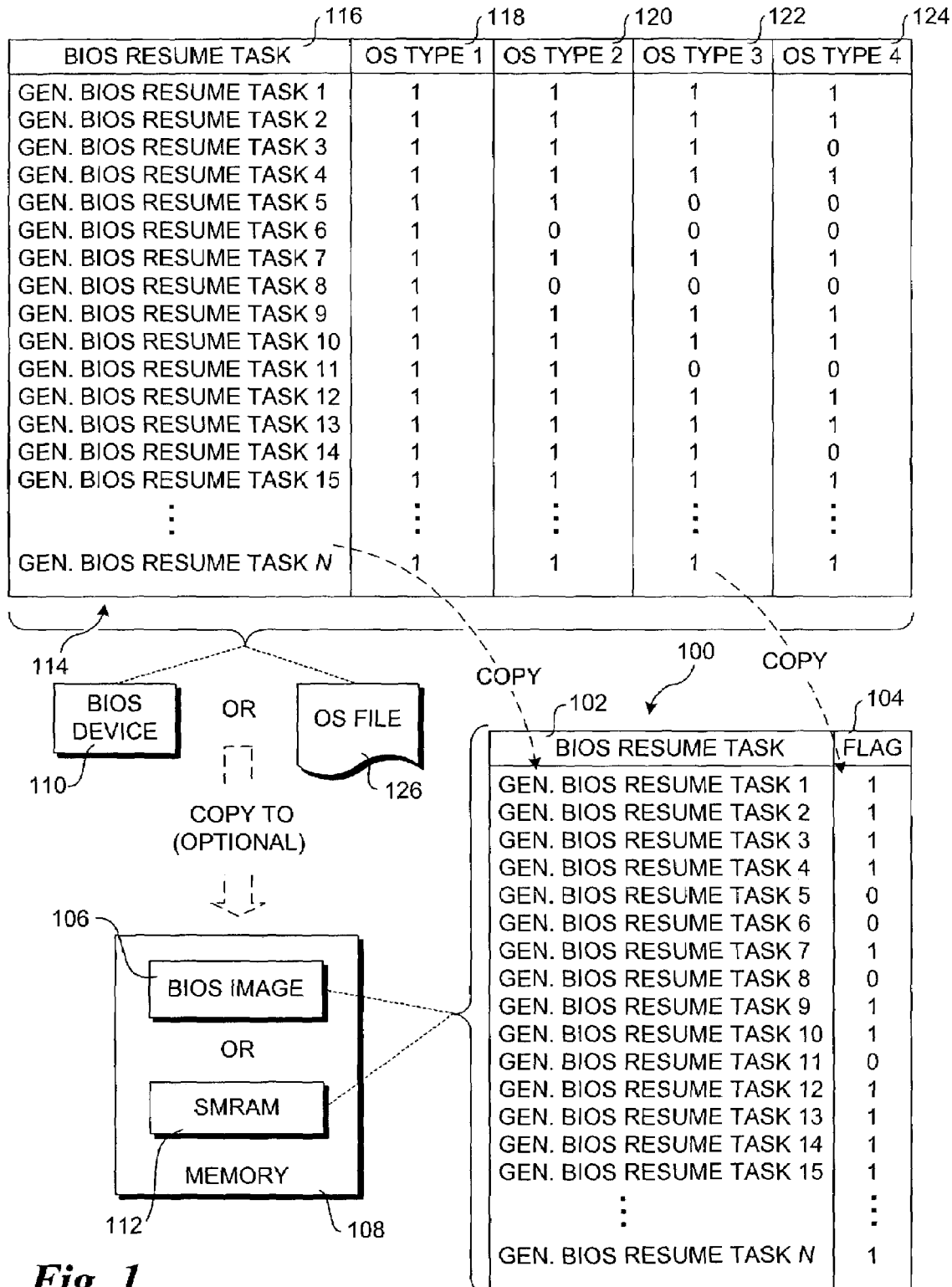
FIG. 1 is schematic diagram illustrating exemplary embodiments for initial storage and run-time storage of BIOS resume tasks that are performed in response to a sleeping state wake event in accordance with aspects of the invention.

Embodiments of method and apparatus for reducing BOIS resume time from a sleeping state are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Today, the BIOS resume process consists of many task performed in a predetermined sequence, and the tasks performed by the BIOS are the same regardless of what operating system is running. As used herein, these tasks are referred to as "BIOS resume tasks." For example, for S2 and S3 sleeping states, these BIOS resume tasks may include (but are not limited to) to following typical actions:

1. Processor reset, execution begins out of BIOS FLASH in bootblock
2. Mask PIC, initialize memory controller
3. Initialize SMBus controller
4. Turn on CPU cache and mark E000–F000h segments as WP cacheable
5. Initialize system timer
6. Init super I/O. Check floppy and LPT for bootblock flash update
7. Checksum BIOS image
8. Find entry point and jump to normal BIOS
9. ACPI S3 resume detected. Restore memory controller registers from NVRAM
10. Enable F000 shadow and jump to memory copy of code path
11. Open SMRAM
12. Turn off CPU cache for relocation SMI purposes
13. Switch into big-real mode (32-bit addressing)
14. Create stack area in lower memory by copying contents to SMRAM region 15. Save lower memory area to SMRAM, and copy BIOS code from SMRAM
16. Enable SCI
17. Calculate SMBASE address
18. Turn on CPU caches
19. Enable software SMI
20. Generate software SMI to restore miscellaneous registers (GMCH, ICH3-M, SIO, EC, miscellaneous chipset registers).
21. Perform chipset workarounds
22. Reinit CPU (microcode update load, feature enable/disable, etc.)
23. Initialize clock chip
24. Initialize graphics controller (may include re-POST operation)
25. Initialize Cardbus controller
26. Initialize USB controllers
27. Initialize LAN controllers
28. Initialize keyboard controller, keyboard, and mice
29. Restore lower memory from SMRAM used for BIOS copy
30. Restore lower memory used for stack
31. Disable CPU caches
32. Close SMRAM
33. Restore SMRAM configuration
34. Lock SMRAM
35. Enables CPU caches
36. Jump to OS Several of these tasks are very slow and time-consuming. For example, keyboard controller, keyboard, and mouse initialization takes several hundred milliseconds, while graphics controller re-POST operations can take nearly 900 milliseconds. Although these operations are necessary for initial ACPI-compliant operating systems (e.g., Windows 98), they are not necessary for newer operating systems such as Windows XP. In accordance with aspects of the invention, various mechanisms are provided herein for addressing the foregoing situation by only performing BIOS resume tasks required by a particular operating system type while skipping non-required taks, thereby dramatically reducing the BIOS resume time for platforms running newer operating systems.

In order to perform an OS-specific BIOS resume task process, the particular OS running on the platform will first be identified. This can be accomplished by one of various well-known means, such as a function call to the OS, operating system registry information, etc. In one embodiment, the OS is determined through ACPI. For example, the following code may be used to determine whether the platform is running Windows 98 (first and second editions), Windows ME, Windows 2000, or Windows XP:

Listing 1

```
Scope(_SB) //Scope
{
Include("strcmp.asl")
Name(TOOS, 0) // Global variable for type of OS.
//
// This methods set the "TOOS" variable depending on the type of OS
// installed on the system.
// TOOS = 1 // Windows 98 & SE
// TOOS = 2 // Windows Me.
// TOOS = 3 // Windows 2000 OS or above version.
// TOOS = 4 // Windows XP OS or above version.
//
Method(_INI)
{
    if(CondRefOf(_OSI,Local0))
    {
        if (\_OSI("Windows 2001"))
        {
            Store( 4, TOOS)
        }
    }
    else
    {
        Store (\_OS,local0)
        Store (SCMP(local0,"Microsoft Windows NT"),local1)
//SCMP (string compare function), implementation dependent
//SCMP takes two inputs and returns 0 if true, one or ones if false
        if (Not(local1))
        {
            Store( 3, TOOS)
        }
        else
        {
            Store (SCMP(local0,"Microsoft Windows"),local2)
            If (Not(local2))
            {
                Store( 1, TOOS)
            }
```

-continued

Listing 1

```
            else
            {
                Store (SCMP(local0,"Microsoft WindowsME:Millennium Edition"),local3)
                If (Not(local3))
                {
                    Store( 2, TOOS)
                }
            }
        }
    } // end of else
}//end of _INI
//
// rest of code under _SB
//
} // endof_SB
```

Once the code in Listing 1 has executed, the variable TOOS identifies the type of operating system that is currently running on the platform. With this information, it is now possible for the ASL (ACPI Source Language (BIOS code that is interpreted by the OS)) code to inform the system BIOS what operating system is currently running. This can be done through ASL code by generating a system management interrupt (SMI) to the OS. The following code shows how an SMI can be generated from ASL code:

Listing 2

```
Method(_SMI, 1)
{
    Store(TOOS, SMID)    // Store OS type in chipset SMI data port
    Store(0x80, SMIC)    // Write OS SMI command to chipset SMI
command port
}
```

This code writes the OS type value (as identified via execution of code Listing 1 or an alternate method) to a data port within the chipset. The code then initiates an SMI by writing to the SMI command port. When the chipset sees a write to the SMI command port, the BIOS SMI handler begins executing. The SMI handler will identify the type of command, in this example 80h, identify it as an OS notification SMI, and then read the TOOS value from the chipset SMI data port. The SMI handler is now cognizant of the OS type, and can make this information available to the system BIOS responsible for the S2/S3 wake process.

In addition to the foregoing scheme, there are many other techniques for passing information identifying the OS type to the BIOS. For example, the ACPI code could write the OS type to a non-volatile register in the chipset, to an EEPROM (FLASH ROM), or an embedded controller, to name a few.

In accordance with further aspects of the invention, once the OS type is known, an OS-type specific set of BIOS resume tasks are performed in response to an S2 or S3 wake event. In one embodiment, this is accomplished by storing data comprising a common set of BIOS resume tasks (i.e., a "generic" set of BIOS resume tasks including tasks that may be used by various applicable operating systems) along with a flag field for each task, as shown by a BIOS resume task table 100 in FIG. 1. BIOS resume task table 100 includes a BIOS RESUME TASK column 102, and a FLAG column 104. In one embodiment the BIOS RESUME TASK column includes a set of generic BIOS resume tasks that are selectively dispatched for execution sequentially in accordance with each task's corresponding FLAG field value. For example, operations having a flag value of "1" are dispatched for execution, while operations having a flag value of "0" are skipped.

In accordance with one embodiment of the invention, BIOS resume task table 100 is stored in a BIOS image 106 in system memory 108, as shown in FIG. 1. A BIOS image (generally) comprises a replica of the BIOS instructions and data stored on one or more BIOS devices 110 in a computer system. BIOS images are commonly used in computer systems rather than merely using the BIOS device(s) alone, because system memory provides faster access than typical BIOS devices.

In another embodiment, the BIOS resume task table 100 is stored in SMRAM (System Management RAM) 112 or comprises a portion of the BIOS image stored in memory by the computer platform. Generally, SMRAM comprises a type of protected memory that is visible to the platform, but hidden from the operation system. Among other things, the SMRAM is typically used to store code sequences that are executed in response to various system management mode events.

In accordance with one embodiment of the invention, the FLAG field values for the specific operating system are loaded into the BIOS image or SMRAM during or immediately subsequent to OS initialization. For example, as shown in a block 200 of the flowchart of FIG. 2, after an initial portion of the OS has been loaded into RAM and initialized, the ASL code in Listing 1 (or other OS-identification code) is executed to identify the OS type. Next, in a block 202, the list of generic BIOS resume tasks along with a set of corresponding FLAG values for the identified OS type are loaded into the BIOS image or SMRAM.

In one embodiment, a master BIOS resume task/OS-type flag table 114 is stored in the BIOS device or other non-volatile memory component (e.g., a Flash memory device) on the computer platform. The master BIOS resume task/OS-type flag table includes a BIOS RESUME TASK column 116, along with respective OS TYPE Flag columns 118, 120, 122, and 124, depicted for illustrative purposes as OSTYPE 1, OSTYPE 2, OS TYPE 3, and OS TYPE 4. Each of these columns includes a respective set of FLAG values for its corresponding OS type. For example, suppose that OS TYPE 1 corresponds to Windows 98, OS TYPE 2 corresponds to Windows ME, OS TYPE 3 corresponds to Windows 2000, and OS TYPE 4 corresponds to Windows XP. Accordingly, the FLAG values in the OS TYPE 1 flag column 112 contain a set of flags marking which BIOS resume tasks are to be performed in response to an S2 or S3 waking event when the operating system is Windows 98 (in this example, all of the operations). Similarly, OS TYPE Flag columns 120, 122, and 124 respectively contain sets of flags marking which BIOS resume tasks are to be performed in response to an S2 or S3 waking event for Windows ME, Windows 2000, and Windows XP. Notice in this example that the number of tasks required to be performed in response to a sleeping state wake event are reduced as the operating system advances. In an actual implementation, this may or may not hold true.

In accordance with the operations of block 202 and the present example, the BIOS resume tasks and corresponding flag set for the OS type that is identified are loaded into BIOS image 106 or SMRAM 112, as graphically depicted. In the illustrated example, the OS-type is assumed to be OS TYPE 3.

In another embodiment, data corresponding to BIOS resume task/OS type flag table 114 may be stored in an OS file 126 and loaded via an OS driver or BIOS code during the OS initialization. In this instance, the BIOS resume/OS type flag table may contain multiple OS-TYPE Flag columns, such as illustrated in FIG. 1, or may contain only a single Flag column specific to that OS type. In addition, BIOS resume tasks and corresponding flag data pertaining to respective computer platform types may be contained in one or more tables that are similar to BIOS resume task/OS type flag table 114 (not shown). For example, the OS may include a separate table for each of a plurality of computer platform types. Generally, such data may be stored in a single file, or respective files for each platform type.

Figure 2:
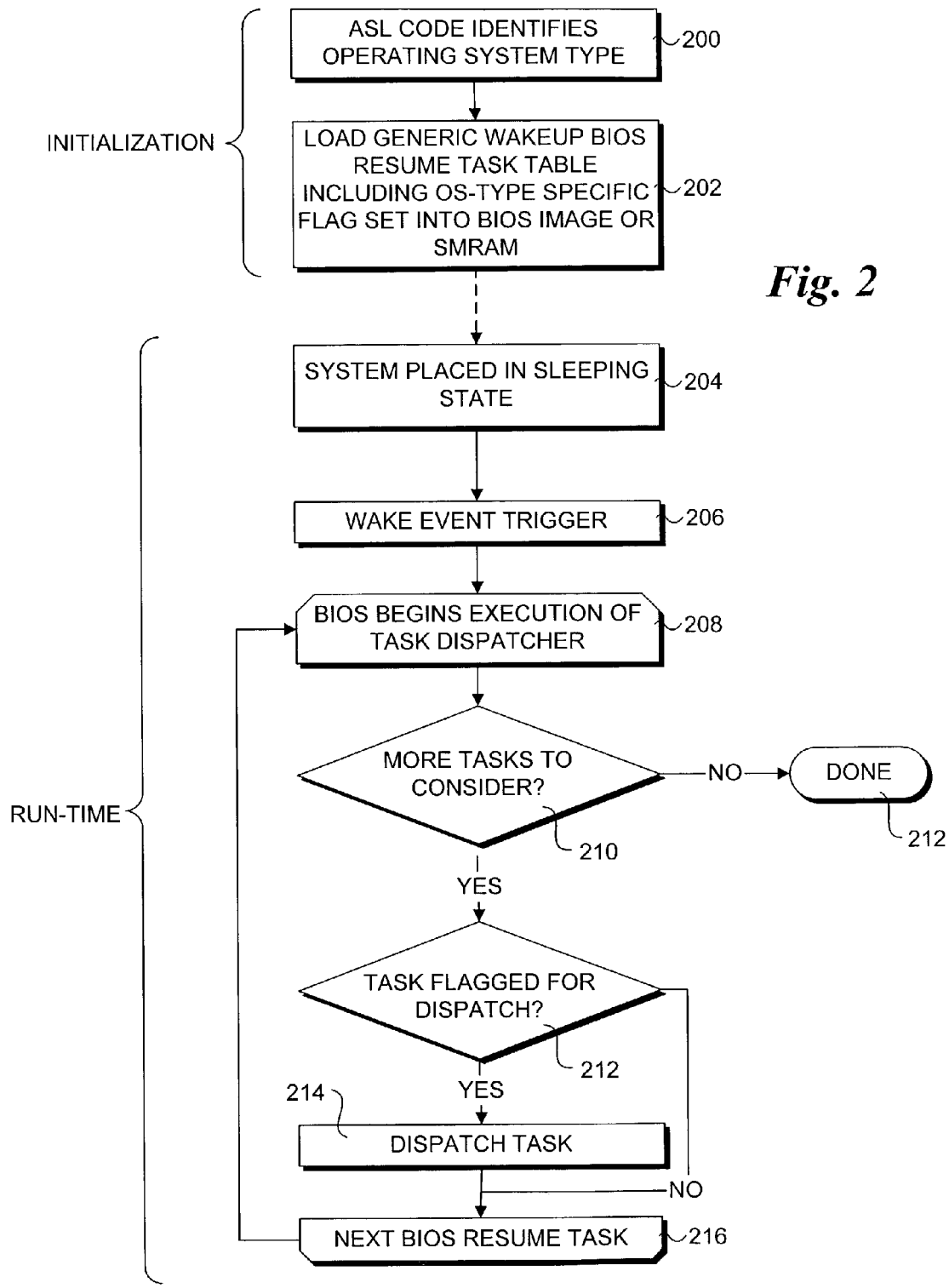
FIG. 2 is a flowchart illustrating logic and operations performed during an initialization phase and at run-time to enable a computer system to perform an operating system type specific set of BIOS resume tasks in response to a sleeping state wake event.

Returning to the flowchart of FIG. 2, during run-time platform operation the system is placed in a sleeping state (e.g., S2 or S3) in a block 204 in response to various types of user input or monitored activity, as described above. For example, the use may select to but the computer into a sleeping state, or the computer may determine on its own that no user applications have been executing for a predetermined period of time, so the system can go into a sleeping state.

Next, in response to a wake event trigger in a block 206, the BIOS begins execution of a task dispatcher in a begin loop block 208. The task dispatcher sequences through the tasks in BIOS resume task table 100, beginning with the first task in the list. In a decision block 210, a determination is made to whether there are any more tasks to consider for dispatch. If the answer is NO, all of the tasks for returning the platform to a normal (awakened) operating state have been completed. If not, the answer to decision block 210 will be YES, and the logic will proceed to a decision block 212 to determine if the current task is flagged for dispatch. If it is, the operation is dispatched for execution in a block 214 and the foregoing logic and operations are repeated for the next task in the sequence, as illustrated by an end loop block 216 and begin loop block 208. If the currently-considered task is not flagged for dispatch, the task is skipped, and the logic loops back to begin loop block 208 to consider the next task in the list. This process is repeated until all of the tasks in the list have been considered for dispatch.

Thus, by means of the foregoing scheme, only those BIOS resume tasks necessary to be performed for the identified operating system are dispatched for execution in response to an S2 or S3 wakeup event. Accordingly, the BIOS resume time can be greatly reduced. For example, for advanced operating systems such as Windows XP, time consuming operations that would have been performed in the prior art, such as graphics controller re-POST, keyboard controller initialization, keyboard and mouse initialization, etc., will be skipped, thereby reducing the BIOS resume time. Additionally, the scheme can also support various legacy operating systems.

The advantage of using this technique over what is done now is that improvements may be made to the system resume time without introducing risk and complexity and the need to add features to older OSes that do not need to meet such stringent requirements. This allows the BIOS resume time problem to be selectively attacked on newer OSes where resume time is critical, while still allowing functional operation on older OSes.

Figure 3:
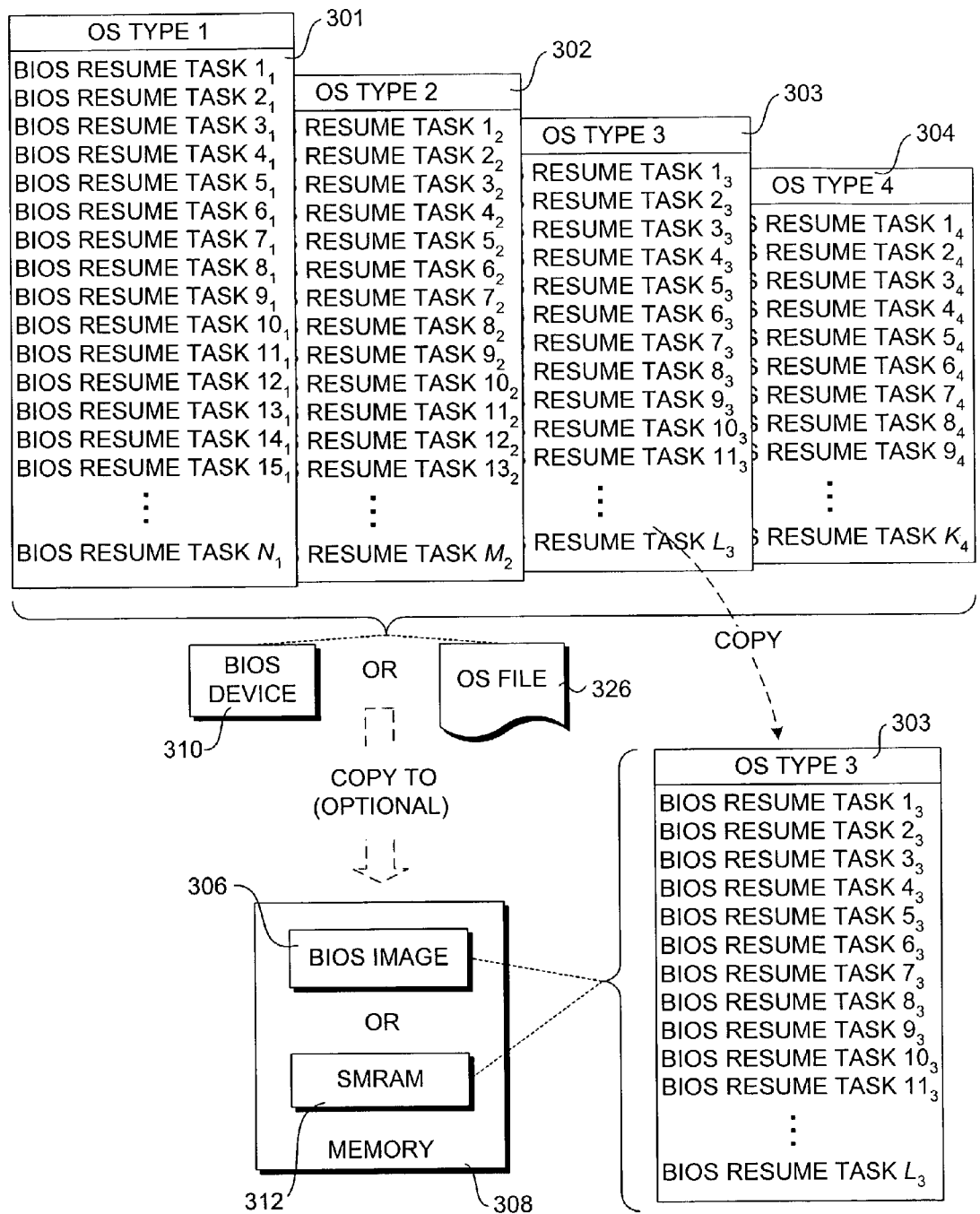
FIG. 3 is a schematic diagram illustrating an alternate scheme for storing BIOS resume task data.

An optional embodiment for storing the BIOS resume task/OS type data is shown in FIG. 3. In this instance, a separate list of BIOS resume tasks is stored for each operating system type, including a list 301 for OS type 1, a list 302 for OS type 2, a list 303 for OS type 3, and a list 304 for OS type 4. Each list contains the set of BIOS resume tasks that are to be performed in response to a wake event for the particular operating system type to which the list corresponds. As such, there is no need for the previous flag column. As before, the lists may be stored in a BIOS device 310 or an operating system file 326.

During platform/OS initialization, the operating system is determined, and the appropriate BIOS resume task list for that operating system is identified. In one embodiment, indicia identifying the location of the list (e.g., its starting address) is stored by the BIOS device or in a register, and the list is accessed directly from the BIOS device at run-time. However, as before, in most instances a BIOS image 306 will be copied into memory 308, enabling access to the BIOS operations via the faster memory. In this instance, the identified list is copied into the BIOS image, or other indicia is provided to locate the appropriate list in the BIOS image. Optionally, the identified list may be copied into SMRAM 312.

In other embodiments, the various BIOS resume task information may be stored in a set of tables or group of lists, with each table or group pertaining to a particular computer platform type. For example, sets of such tables and groups of such lists may be stored on a network server, wherein an appropriate table or list for a particular computer platform type and operating system may be downloaded from the network server as a carrier wave.

In yet another embodiment, an operating system may include a plurality of tables, or lists that are stored or otherwise configured based on computer platform type. For example, an operating system might include one or more files in which data identifying different sets of BIOS resume tasks that are to be performed for respective computer platform types are stored. During OS installation, the particular computer platform type is identified, and the appropriate set of BIOS resume tasks is either stored by the operating system (e.g., on a hard disk) or copied into a BIOS or other firmware device on the platform.

Exemplary Computer System for Practicing Embodiments of the Invention

Figure 4:
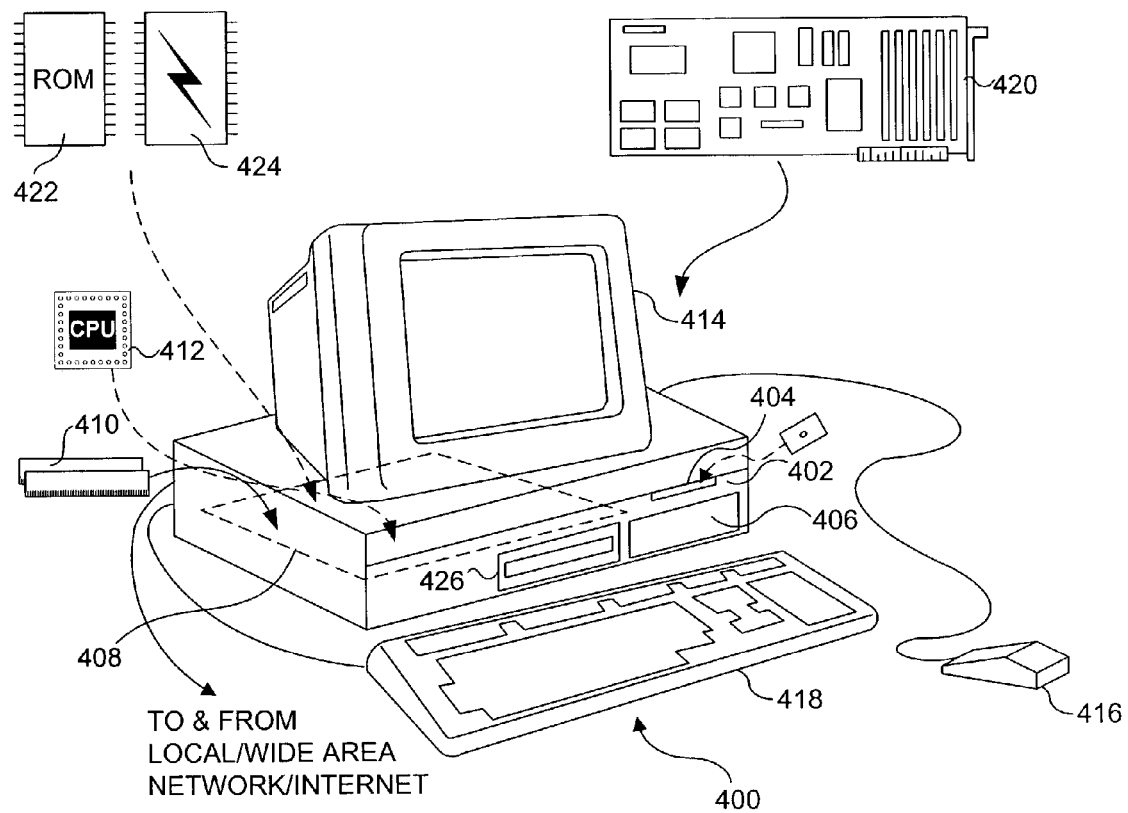
FIG. 4 is a schematic diagram of an exemplary computer system for practicing embodiments of the invention disclosed herein.

With reference to FIG. 4, a generally conventional computer 400 is illustrated, which is suitable for use in connection with practicing embodiments of the present invention. Examples of computers that may be suitable for the embodiments discussed above include PC-class systems operating various Microsoft Windows operating systems, UNIX-based computers, workstations, and servers, and various computer architectures that implement LINUX operating systems. Computer 400 is also intended to encompass various server architectures, as well as computers having multiple processors.

Computer 400 includes a processor chassis 402 in which are mounted a floppy disk drive 404, a hard drive 406, a motherboard 408 populated with appropriate integrated circuits including memory 410 and one or more processors (CPUs) 412, and a power supply (also not shown), as are generally well known to those of ordinary skill in the art. It will be understood that hard drive 406 may comprise a single unit, or multiple hard drives, and may optionally reside outside of computer 400. A monitor 414 is included for displaying graphics and text generated by software programs and program modules that are run by the computer. A mouse 416 (or other pointing device) may be connected to a serial port (or to a bus port or USB port) on the rear of processor chassis 402, and signals from mouse 416 are conveyed to the motherboard to control a cursor on the display and to select text, menu options, and graphic components displayed on monitor 414 by software programs and modules executing on the computer. In addition, a keyboard 418 is coupled to the motherboard for user entry of text and commands that affect the running of software programs executing on the computer. Computer 400 also includes a network interface card 420 for connecting the computer to a computer network, such as a local area network, wide area network, or the Internet.

Computer 400 also includes platform firmware (BIOS), which will typically comprise firmware stored in one or more read-only memory (ROM) components, such as a conventional ROM 422 or flash memory device 424, which are mounted on motherboard 408.

Computer 400 may also optionally include a compact disk-read only memory (CD-ROM) drive 426 into which a CD-ROM disk may be inserted so that executable files and data on the disk can be read for transfer into the memory and/or into storage on hard drive 406 of computer 400. Other mass memory storage devices such as an optical recorded medium or DVD drive may be included. In cases in which the BIOS resume task data are provided by an operating system, the operating system will likely be distributed on floppy disks or CD-ROMs (or other memory media) and stored on the hard drive until loaded into random access memory (RAM) for execution by the CPU. Optionally, as discussed above, the BIOS resume task data may be stored on a BIOS device such ROM 422 or flash memory device 424. Optionally, all or a portion of the BIOS resume data may be loaded via a computer network as a carrier wave.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
   determining an operating system type running on a computer system;
   identifying basic input output system (BIOS) resume tasks that are to be performed in response to a wake event based on the operating system type that is determined;
   entering a sleep state in a computer system; and
   in response to a sleeping state wake event, performing the BIOS resume tasks that are identified.

2. The method of claim 1, wherein the BIOS resume tasks are identified by marking selected tasks for dispatch in a generic list of BIOS resume tasks.

3. The method of claim 2, further comprising copying the generic list of BIOS resume tasks into memory, along with indicia identifying which BIOS resume tasks in the list are to be dispatched; and
   dispatching those BIOS resume tasks in response to the wake event.

4. The method of claim 3, wherein the generic list of BIOS resume tasks and identifying indicia are copied from a table including a column containing the BIOS resume tasks and a plurality of flag columns, each containing a respective set of operating system type specific flags marking which BIOS resume tasks are to be performed for that operating system type.

5. The method of claim 4, wherein the table is stored in a BIOS device.

6. The method of claim 4, wherein the table is stored in an operating system file.

7. The method of claim 1, further comprising one of generating or identifying an existing location of a list of BIOS resume tasks specific to the operating system type that is determined; and
   dispatching the BIOS resume tasks in the list in response to the wake event.

8. The method of claim 7, wherein the list of BIOS resume tasks is generated from data stored in a table including a column containing a generic list of BIOS resume tasks and a plurality of flag columns, each containing a respective set of operating system type specific flags marking which BIOS resume tasks in the generic list of BIOS resume tasks are to be performed for that operating system type.

9. The method of claim 7, wherein data corresponding to the list of BIOS resume tasks specific to the operating system type are stored in a BIOS device.

10. The method of claim 9, further comprising copying the list of BIOS resume tasks into system memory.

11. The method of claim 7, wherein data corresponding to the list of BIOS resume tasks specific to the operating system type are stored in an operating system file, further comprising copying the list of BIOS resume tasks into system memory.

12. The method of claim 1, further comprising:
    downloading of a list of BIOS resume tasks specific to the operating system type that is determined;
    storing the downloaded list of BIOS resume tasks; and
    dispatching the BIOS resume tasks in the list for execution in response to the wake event.

13. The method of claim 12, wherein the downloaded list of BIOS resume tasks are stored in a BIOS device.

14. The method of claim 12, wherein the downloaded list of BIOS resume tasks are stored on a computer system storage device, further comprising copying the list of BIOS resume tasks from the storage device into system memory during an computer system and/or operating system initialization phase.

15. The method of claim 7, further comprising:
storing respective lists of BIOS resume tasks, each list containing a set of BIOS resume task that are to be performed in response to a wake event that are specific to a respective operating system type; and
copying the list of BIOS resume tasks specific to the operating system type that is determined to generate the BIOS resume tasks list.

16. A BIOS device having data stored thereon, including:
data identifying a plurality of respective sets of operating system type-specific BIOS resume tasks, each set of operating system type-specific BIOS resume tasks comprising BIOS resume tasks that are to be performed for a respective operating system type in response to a computer system sleeping state wake event.

17. The BIOS device of claim 16, wherein the data identifying the plurality of respective sets of operating system type-specific BIOS resume tasks are stored as a table including a column containing a list of generic BIOS resume tasks and a plurality of flag columns, each containing a respective set of operating system type specific flags marking which BIOS resume tasks are to be performed for that operating system type.

18. The BIOS device of claim 16, wherein the data identifying the plurality of respective sets of operating system type-specific BIOS resume tasks are stored as respective lists, each list containing BIOS resume tasks that are to be performed in response to a sleeping state wake event.

19. A machine-readable medium having stored thereon a plurality of instructions, which if executed by a machine, cause the machine to perform a method comprising:
identifying a plurality of respective sets of operating system type-specific BIOS resume tasks, each set of operating system type-specific BIOS resume tasks comprising BIOS resume tasks that are to be performed for a respective operating system type in response to a sleeping state wake event.

20. The machine readable medium of claim 19, wherein the data identifying the plurality of respective sets of operating system type-specific BIOS resume tasks are stored as a table including a column containing a list of generic BIOS resume tasks and a plurality of flag columns, each containing a respective set of operating system type specific flags marking which BIOS resume tasks are to be performed for that operating system type.

21. The machine readable medium of claim 19, wherein the data identifying the plurality of respective sets of operating system type-specific BIOS resume tasks are stored in respective tables, each table including a column containing a list of generic BIOS resume tasks and a plurality of flag columns and being specific to a computer platform type, each containing a respective set of operating system type specific flags marking which BIOS resume tasks are to be performed for that operating system type.

22. The machine readable medium of claim 19, wherein the data identifying the plurality of respective sets of operating system type-specific BIOS resume tasks are stored as respective lists, each list containing BIOS resume tasks that are to be performed in response to a sleeping state wake event.

23. The machine readable medium of claim 22, wherein the respective lists include operating system type-specific BIOS resume tasks that are specific for a computer platform type.

24. The machine readable medium of claim 22, wherein the machine readable medium further comprises read-only memory (ROM).

25. A computer system, comprising:
a motherboard including:
a processor;
memory coupled to the processor; and
a BIOS device coupled to the processor, having data stored thereon identifying a plurality of respective sets of operating system type-specific BIOS resume tasks, each set of operating system type-specific BIOS resume tasks comprising BIOS resume tasks that are to be performed for a respective operating system type in response to a computer system sleeping state wake event.

26. The computer system of claim 25, wherein the data identifying the plurality of respective sets of operating system type-specific BIOS resume tasks are stored as a table including a column containing a list of generic BIOS resume tasks and a plurality of flag columns, each containing a respective set of operating system type specific flags marking which BIOS resume tasks are to be performed for that operating system type.

27. The computer system of claim 25, wherein the data identifying the plurality of respective sets of operating system type-specific BIOS resume tasks are stored as respective lists, each list containing BIOS resume tasks that are to be performed in response to a sleeping state wake event.

28. The computer system of claim 25, wherein the BIOS device further contains instructions, which when executed by the processor performs operations including:
identifying an operating system type running on the computer system, and
copying a set of BIOS resume tasks specific to the operating system type that is identified from the BIOS device to the memory.

29. The computer system of claim 28, wherein the set of BIOS resume tasks specific to the operating system type are copied into one of a BIOS image or system management random access memory RAM (SMRAM) portion of the memory.

* * * * *